INVENTOR
PAUL MUCHNICK
BY Herbert W. Arnold
ATTORNEY

United States Patent Office 3,536,989
Patented Oct. 27, 1970

3,536,989
REGULATED POWER SUPPLY WITH NETWORK TO REDUCE PROGRAMMING REACTION TIME
Paul Muchnick, Norwalk, Conn., assignor to Raytheon Company, Lexington, Mass., a corporation of Delaware
Filed Oct. 7, 1968, Ser. No. 765,443
Int. Cl. G05f 1/58
U.S. Cl. 323—20                                     12 Claims

ABSTRACT OF THE DISCLOSURE

An output voltage discharge network for use in reducing the fall time during down programming in a power supply for utilizing a simple network to sense the programming requirement and quickly act to cut off the passing stages and reduce the amplifier reaction time. Prior art systems have a relatively long fall time caused by the time delays in the low level stages of the amplifier and/or utilize power transistors to discharge output capacitors to decrease the programming time. The particular network is especially useful in automatic testing programs where different voltage levels are required in rapid sequence.

BACKGROUND OF THE INVENTION

This invention relates to regulated power supplies, and more particularly to improved circuit means associated with programmed power supplies for decreasing the voltage fall time during programming which is predominantly caused by the slow reaction time of the power supply amplifier rather than by an output capacitor.

Many power supplies of the programmed type have heretofore made use of a large electrolytic capacitor across the output for voltage stabilization, resulting in a relatively long fall time in response to external control signals during down programming of such supplies. This long fall time, as is known, is generally determined by the RC time constant of the output capacitor and the load. The faster the programming speed required, the smaller becomes the available fall time of the equipment between voltage settings. Previous methods aimed at the reduction of fall time to achieve faster programming capability were concerned with discharging output capacitors by use of power transistors or, in some cases, the elimination of the output capacitor. However, even though presently available fast-programming power supplies are generally constructed with little or no output capacity, they may still have a relatively long fall time due to time delays introduced by capacitance in the low level stages of the power supply amplifier for amplifying sensing signals used to control the series pass stage. It would be desirable, therefore, to provide a novel circuit for reducing fall time, during programming, caused by time delays in the stages of the power supply amplifier, such reduction in fall time becoming particularly desirable in instances where fast programming time is a requisite, such as in automatic testing programs where different voltage output levels are required and where fast programming requires smaller fall time of the equipment between output voltage settings.

Accordingly, it is an object of the present invention to provide a novel circuit for reducing fall time in response to voltage control signals in fast-programmed power supplies.

A further object of the present invention is to provide an improved network for reducing fall time in a programmed power supply that is relatively simple in construction and operation, and yet highly efficient in use.

SUMMARY OF THE INVENTION

In accordance with the present invention, an output voltage discharge network is applied to a well-known voltage regulated power supply employing a voltage sensing amplifier which senses a programmed output voltage and provides a control signal to vary the impedance of a series passing stage. The novel discharge network utilizes a device which senses the programming signal and acts quickly to cut off the passing stage and reduce the amplifier reaction time. In one embodiment, a transistor is connected to sense a drop in programmed voltage due to a reduction of programming resistance in the power supply, signifying down programming to a lower steady state output voltage level. The transistor is forward biased to conduct in response to the drop in program voltage and is coupled to the common junction of the voltage sensing amplifier and the control electrode of the series passing transistor in such a manner as to divert the control signal current output of the voltage sensing amplifier from reaching the series passing stage and simultaneously block or cut off this series passing stage, thus providing an open circuit and causing the output voltage to react and fall more rapidly than in response to a corresponding delayed control signal from the voltage sensing amplifier to the series passing stage.

BRIEF DESCRIPTION OF THE DRAWINGS

For a better understanding of the present invention, together with other and further objects thereof, reference is made to the following description taken in connection with the accompanying drawings, in which.

DESCRIPTION OF THE PREFERRED EMBODIMENT

Figure 1:
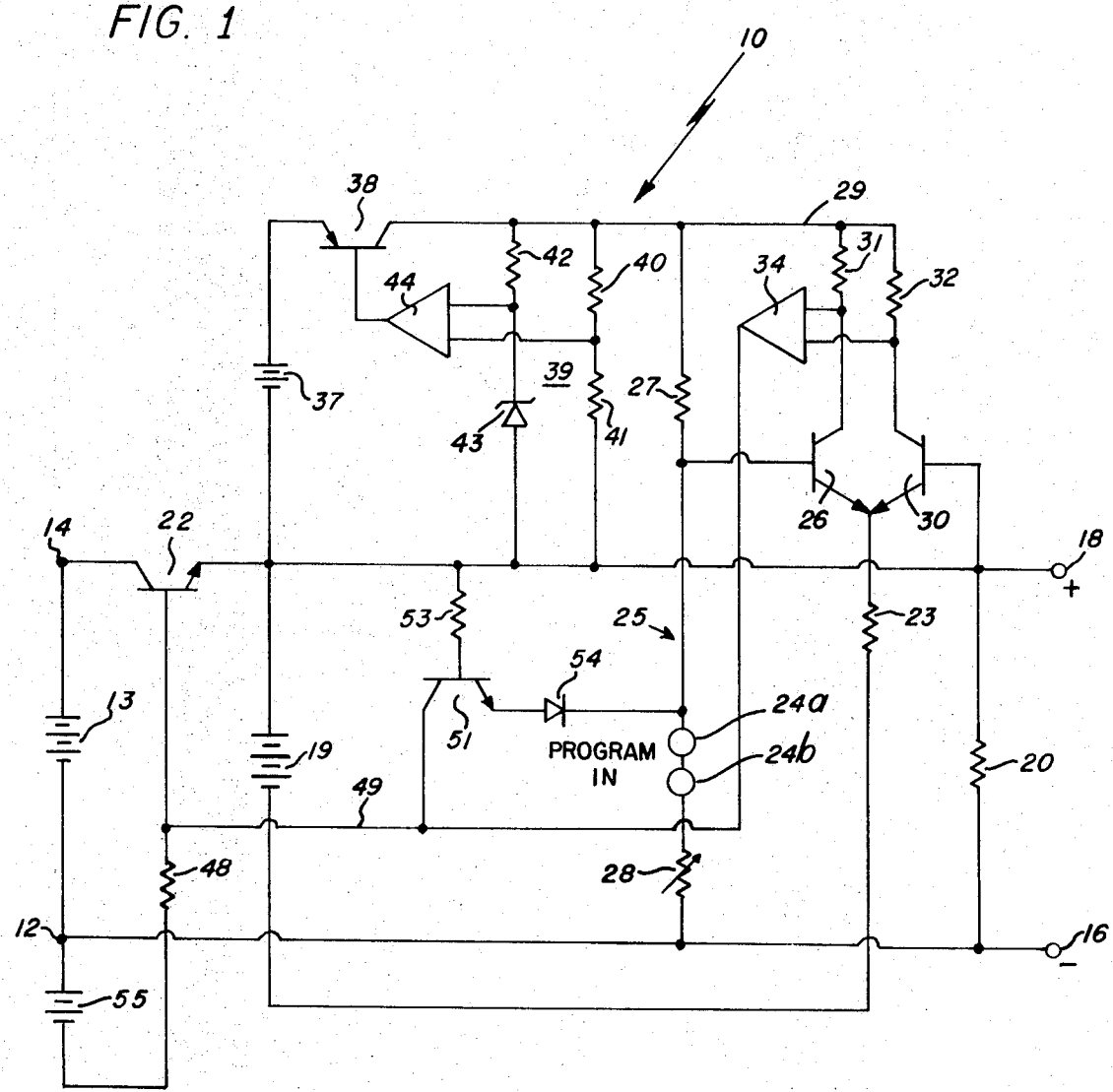
FIG. 1 is a schematic circuit diagram of a transistorized voltage regulating circuit employing the output voltage discharge circuit of the present invention.

Referring now to FIG. 1, there is shown a voltage regulating circuit 10 having a negative input terminal 12 and a positive input terminal 14 adapted to receive a source of unregulated unidirectional voltage, such as shown by source 13. The regulating circuit 10 is provided with a negative output terminal 16 and a positive output terminal 18, for supplying regulated output voltage to a load, represented as resistor 20. The negative input terminal 12 is connected to the negative output terminal 16. A series transistor or series regulator 22 has its collector connected to the positive input terminal 14 and its emitter connected to positive output terminal 18. The series transistor 22 may be considered a variable impedance whose impedance is controlled by a signal on its base electrode.

Means are provided to sample the amplitude of the output voltage between terminals 16 and 18 and to feed the sampled voltage back degeneratively to the base of transistor 22 to vary its impedance in accordance with the amplitude of the output voltage. To this end, a voltage divider 25 is connected between output terminal 16 and output terminal 18 by way of a fixed reference voltage applied across lead 29 and terminal 18. A sample of the output voltage is sensed by transistor 26, the base input of which is connected to the junction of sensing resistor 27 and variable programming resistor 28 in voltage divider 25. The sensing resistors 27 and 28 assure that the output voltage, $+E_o$, is of such a value with respect to ground the $+E_o$ is to the reference voltage $E_{ref}$ as the resistance of resistor 28 is to that of resistor 27.

The emitter of transistor 26 is connected to the emitter of transistor 30 and the transistors 26 and 30 are connected, respectively, through load resistors 31 and 32 to lead 29 which is a source of positive reference voltage. The base of transistor 30 is connected to positive output terminal 18. The emitters of transistors 26 and 30 are connected by a common emitter resistor 23 to a source of negative bias voltage 19. This source of negative voltage 19 is connected to the output side of passing transistor 22 and positive output terminal 18. The output from transistors 26 and 30 which appears as a voltage control signal on the collectors is amplified in a conventional amplifier 34, the output of which is fed to the base of passing transistor 22.

Also, shown in FIG. 1 is a fixed reference supply comprising a source of unregulated voltage 37 connected to a series pass transistor 38 which is connected to a well-known bridge circuit 39 comprising bridge resistors 40, 41, 42 and Zener reference diode 43 to provide a voltage sensing signal to voltage sensing amplifier 44. The output of amplifier 44 is used to control the conduction of passing transistor 38 thereby providing a fixed reference voltage across terminal 18 and lead 29.

In operation, the application of a heavy load across terminals 16 and 18 changes the input to the base of transistor 22 in a well-known manner. The voltage at the junction of resistors 27 and 28 rises with respect to terminal 18 by voltage divider action so as to make the base of transistor 26 more positive with respect to its emitter and more positive than the base of transistor 30, in effect providing forward bias on transistor 26 and reverse bias on transistor 30, thereby unbalancing the base-to-base voltage on differential amplifier transistors 26 and 30, and providing an output control signal to the base of series pass transistor 22. This signal increases conductivity of series pass transistor 22 to restore the voltage level of the power supply in a well-known manner. However, a downward change in power supply output is programmed by reducing the value of variable resistor 28 which can be in response to a remote program control signal or by removing the shunt across terminals 24a and 24b, and injecting a remote program such as a sequence of positive and negative signals.

When the power supply is thus programmed to a lower voltage, the divider action of resistors 27 and 28 reduces the voltage at the base of transistor 26, and amplifier 34 develops a signal to reduce the voltage drive by way of lead 49 to the series pass transistor 22 tending to reduce the output voltage by increasing the impedance of transistor 22. However, the program or sensed signal, in passing through voltage amplifier transistors 26 and 30, and driver amplifier 34 encounters delays due to the presence of resistors and capacitors in the amplifier circuits and in their well-known amplifier stabilizing networks. These delays adversely affect the reaction time of the control signal fed to the series pass transistor, resulting in an increase in fall time and a corresponding decrease in programming response time. In accordance with the invention, a transistor 51 is connected to sense a rapid fall in voltage developed at the junction of resistors 27 and 28, signifying down programming to a lower output voltage level. In response to this fall in voltage, a more positive bias is applied to the base of transistor 51 by way of a current limiting resistor 53, thereby driving transistor 51 to conduction. It should be understood that surge current limiting resistor 53 does not form a part of the invention and that diode 54 is solely for reverse voltage breakdown protection of transistor 51 during "up" programming in which a heavy positive voltage on the emitter would tend to drive transistor 51 to reverse Zener breakdown, resulting in unwanted current flow through sensing resistors 27 and 28.

When transistor 51 conducts, the output of driver amplifier 34 is instantly diverted from the base of transistor 22 and instead flows into the collector of transistor 51 and through sensing resistor 28, power source 13 and series pass transistor 22, to the source 37, transistor 38 input of amplifier 34. Conduction of transistor 51 thus effectively diverts the amplifier control current from remaining on after the completion of a rapid down program signal to voltage sensing amplifier transistors 26 and 30 and amplifier 34. This permits a reverse bias drive to block or cut off series passing transistor 22 by current flow through bias resistor 48 from power source 13 and independent bias supply 55, whereby reverse current tends to flow from the collector to base and block transistor action, thereby effectively providing an open circuit between terminals 14 and 18. Thus, transistor 51 senses a fall in program voltage representing a down program and, being effectively connected in parallel with transistors 26, 30 and amplifier 34, reduces reaction time by initiating a more rapid or shorter output voltage fall time than in response to a delayed control signal from the voltage sensing amplifier. In this manner, a fall time of approximately 120 microseconds is reduced to approximately six microseconds. Additionally, since transistor 51 is poled to respond only to a negative program, recovery toward the positive voltage direction or up programming is permitted from any voltage level.

Figure 2A:
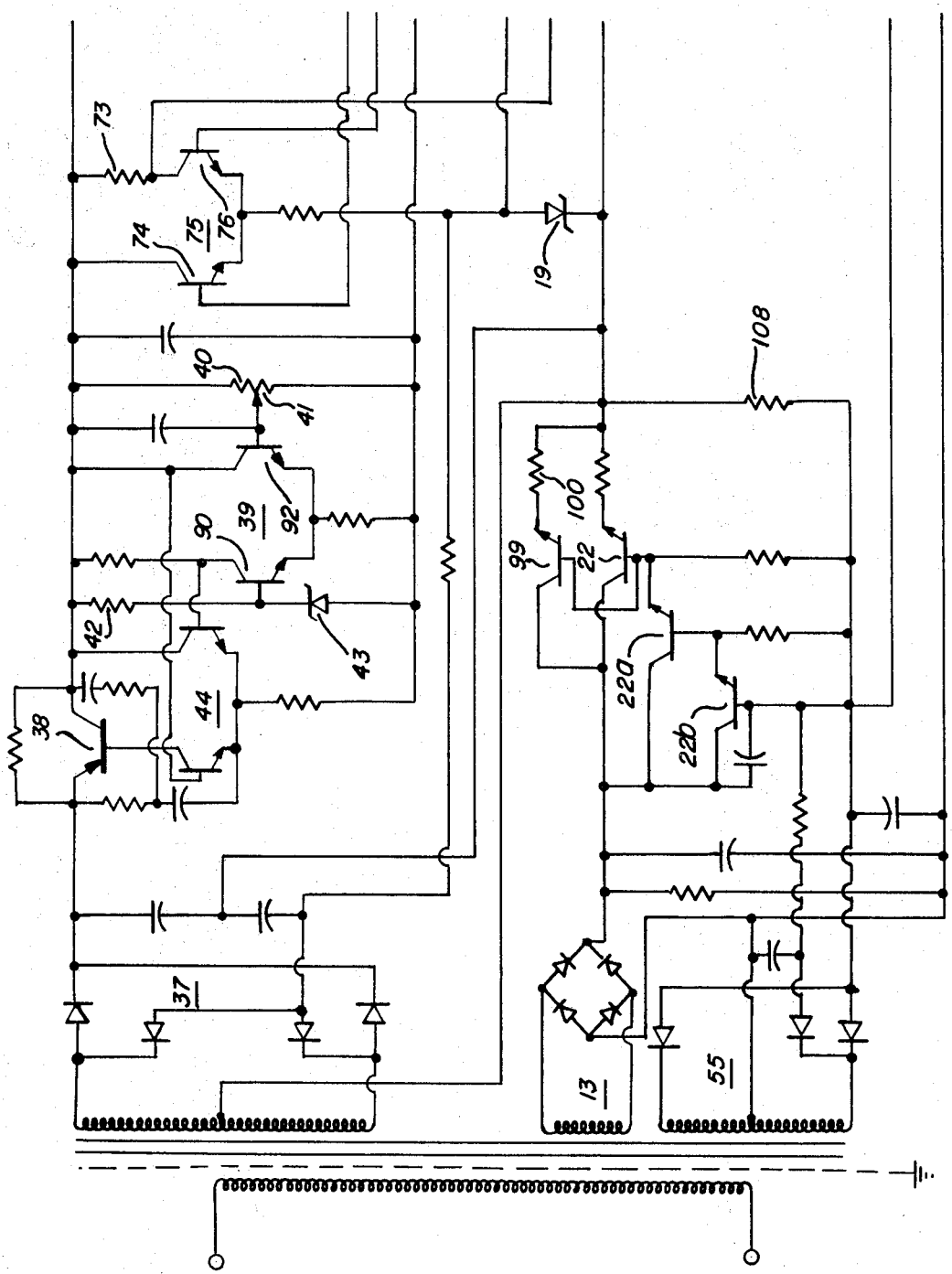
FIGS. 2A and 2B are a schematic circuit in accordance with the form of the invention shown in FIG. 1, but with added details.
Figure 2B:
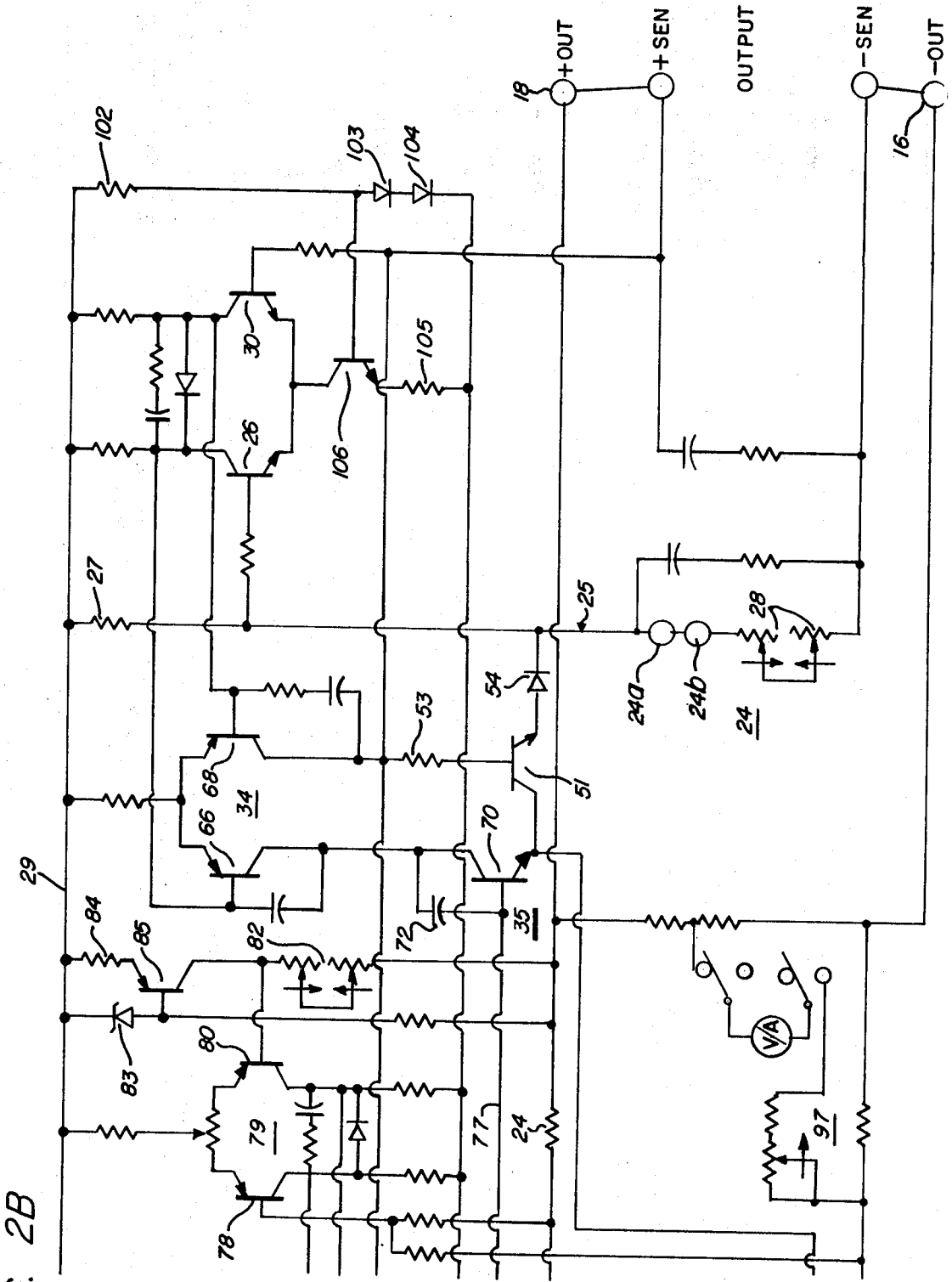

FIGS. 2A and 2B taken together make a complete detailed schematic circuit of a power supply having the form of FIG. 1 but with the added features of regulating in both the constant voltage and constant current modes with automatic crossover between the modes. A typical circuit for generating a control signal in the voltage and current modes and for crossing over from one mode to the other when preset threshold values of voltage and current are exceeded, is set forth in U.S. Pat. No. 3,305,764 of Paul G. Todd. The control circuit shown in this patent is similar to control circuits used in present power supplies. In this figure the corresponding parts in FIG. 1 bear the same numbers. Since the operation of the circuit of FIGS. 2A and 2B will be clear from the above description of FIG. 1, only the additonal means for amplifying the output of the differential amplifiers, the current mode control circuitry, the channel circuit means, and the amplifiers for the series transistor here shown in complete form will be described.

In particular, an unregulated voltage source 13 of FIG. 2A is connected to a series pass transistor 22 and to output terminals 16 and 18 of FIG. 2B. Transistor 22 is fed from a conventional Darlington amplifier including serially connected transistors 22a and 22b in order to amplify the control signal in the voltage mode from differential amplifier transistors 26 and 30. After transistors 26 and 30 sense in the voltage mode, the resulting control signal is applied to transistors 22a and 22b by way of an additional voltage mode amplifier stage 34 including transistors 66 and 68 and a channeling or selection device 35 which includes transistor 70 and stabilizing capacitor 72. This capacitor provides the necessary feedback for stabilization in the current mode. In this mode, transistor 70 acts in a linear manner, as a variable impedance to control the current flow through its emitter. It should be understood that in the voltage mode, a transistor 76 is in a cutoff condition causing a large positive voltage from lead 77 to be impressed on the base of transistor 70 through resistor 73, thus driving transistor 70 into a saturated condition and therefore permitting no hindrance to current flow from voltage mode amplifier 34. In this manner the channeling device 35 operates as a current mode-voltage mode selection device. This selection device 35 can also be, for example, a well-known exclusive "OR" circuit adapted to accept one but not the other of the voltage or current mode control singals.

In the current mode, differential amplifier 79 senses the voltage drop across well-known current sensing resistance 24, the output of which is the current mode control signal applied after amplification to channelling or switching device 35. In the current mode, transistors 74 and 76 of FIG. 2A amplify the current mode control signal developed from the current mode differential amplifier 79. In particular, the voltage drop across sensing resistor 24 in conjunction with a reference voltage developed across resistor 82 is applied to transistors 78 and 80 to provide an unbalance of the current mode differential amplifier 79 in which output developed at the collectors of transistors 78 and 80, respectively, rises and falls. This differential output is connected, respectively, to the inputs of transistors 74 and 76 in amplifier 75. The output of transistor 76 developed at its collector is applied by way of lead 77 to the channelling device 35 to take over control of the series pass transistor 22 and initiate control in the current mode in response to heavy load current.

Also shown in FIG. 2A is a source of unregulated voltage 37 which supplies the necessary power for the reference power supply whose output appears between lead 29 and terminal 18. The reference power supply output is controlled by pass transistor 38 in response to control signals from sensing network 39 and conventional driver amplifier 44. Transistors 90 and 92 have been added to amplify the sensing signal and transmit it to amplifier 44. Additionally, a bias power source 19 comprising a Zener diode provides bias potentials for the voltage and current mode amplifiers and the series pass transistors. Zener reference diode 19 supplies a negative regulated voltage source for the voltage and current mode control amplifiers.

FIG. 2B shows a conventional meter circuit 97 for the power supply and a programming input circuit 24 for introducing, when desired, rapid program control of the power supply. The remote programming resistance or signal is injected at terminals 24a and 24b or the power supply is programmed to a particular level by adjusting variable resistor 28. The terminals +Sense and —Sense are for the purpose of externally sensing output voltages from terminals 16 and 18 at remote equipment locations, in which case the linking connections are omitted and connected at the desired location. In accordance with the invention, transistor 51 is connected in parallel with the voltage mode transistors 26 and 30, voltage mode amplifier transistors 66 and 68 in amplifying stage 34, the output of stage 34, and channeling device 35 and is applied to the series pass transistor. This parallel path thus bypasses any delays such as due to capacitance on the aforementioned amplifiers. Transistor 51 operates with approximately one volt across its base-emitter electrodes and senses the drop in resistance of the programming resistor 28 through reverse voltage protective diode 54 and current limiting resistor 53. Transistor 51 is connected, as shown, to conduct in response to a negative or falling voltage from the junction of voltage divider resistors 27 and 28, and by such conduction to divert the normally delayed driving output of amplifier stage 34 from series pass transistor 22. By conducting in this manner, bias from source 55, which is used to supply negative bias for the passing transistors, the associated Darlington driver amplifiers 22a and 22b and minimum load resistor 108, is now used in conjunction with source 13 to initiate reverse current flow and instantly cut off the passing transistors, thereby reducing amplifier reaction time in response to a program. In effect then, switching or discharge transistor 51 and its associated circuitry immediately discharges accumulation of amplifier output voltage resulting from capacitance in the voltage control amplifier circuits and eliminates delays in fall time resulting from time delays in the voltage amplifier stages.

It should be understood that series transistor 22 is connected in parallel in a known manner with transistor 99 and resistor 100 for increased power handling ability. In addition, the network comprising resistor 102, diodes 103 and 104, resistor 105 and transistor 106 forms a well-known constant current device whereby the total emitter current of the differential amplifier transistors 26 and 30 is held constant. In like manner, Zener diode 83 in conjunction with resistor 84 and transistor 85 provides a constant current source for developing a reference voltage across resistor 82.

From the above description and drawings it will be evident that an amplifier output voltage discharge network has been described which can be used in connection with a voltage regulating circuit without interfering with its normal operation. The discharge circuit operates only in response to a negative program voltage, thereby permitting rapid recovery from any particular voltage level. The foregoing disclosure and drawings are merely illustrative of the principles of the invention and are not to be interpreted in a limiting sense. The only limitations will be determined from the scope of the appended claims.

What is claimed is:

1. A regulated power supply comprising a series regulating transistor connecting the input and output circuits of the power supply, an amplifier circuit operative to produce error signals representative of variations in output potential, means for coupling said error signals to vary the bias on said series transistor toward cutoff, a programming resistor circuit adapted to provide voltage signals to said amplifier, and a transistor circuit adapted to bypass said voltage amplifier in response to down voltage signals from said programming resistor circuit so as to cut off said series transistor at a time previous to the application to said series transistor of corresponding variations in said error signals from said amplifier.

2. A power supply comprising regulating means connected to the input and output circuits of the power supply, amplifier means for amplifying error signals representative of variations in output potential, means for coupling said amplifier error signals to vary the impedance of said regulating means, a programming circuit adapted to provide said error signals to said amplifier means, and semiconductor means connected to bypass said amplifier means in response to reduced voltage from said programming circuit, thereby to substantially increase the impedance of said regulating means at a time previous to the application to said regulating means of corresponding variations in said error signals from said amplifying means.

3. A programmed power supply as set forth in claim 1 in which the amplifier circuit includes a differential amplifier.

4. A power supply as set forth in claim 2 wherein said semiconductor means is a transistor whose input electrode-output electrode path is connected to conduct error signals from said programming circuit to said regulating means.

5. A power supply as set forth in claim 2 wherein the regulating means is a transistor having a control electrode coupled to receive error signals from said amplifier means and said semiconductor means.

6. A regulated power supply circuit comprising a voltage regulator circuit which includes a passing impedance, a sensing circuit coupled to a load circuit for producing a first error signal, a first amplifier coupled to the sensing circuit for amplifying the first error signal, said passing impedance connected in series between an input and output terminal, a series sensing impedance connected in series between an input and output terminal, a second amplifier coupled to the output of said series sensing impedance for amplifying a second error signal developed across said sensing impedance, means for selectively applying said first and second error signals to vary the conductivity of said passing impedance, and a transistor whose input-output electrode path is connected to bypass the input-output path of said first amplifier in response to a down programming first error signal to provide for said passing impedance an output voltage having a shorter fall time than that of said first amplifier.

7. A power supply comprising regulating means including a passing impedance connected between the input and output circuits of the power supply, a programming circuit adapted to provide program signals, amplifying means for providing control signals representative of variations in said program signals, means for applying said control signals to vary the impedance of said regulating means, semiconductor means adapted to conduct in response to negative program signals and connected to bypass the input of said amplifier means, and means in response to said conduction of said semiconductor means to bias said regulating means to cutoff and lower the output voltage of said power supply prior to corresponding variations in control signals from said amplifying means.

8. A power supply as set forth in claim 7 wherein said regulating means is a transistor.

9. A power supply as set forth in claim 7 wherein bypassing of said amplifier means prevents stored up voltage charges in said amplifier means from being applied to said regulating means.

10. A power supply as set forth in claim 7 wherein said semiconductor means is connected to become inoperative at completion of a negative program signal, whereby control signals from said amplifying means vary the impedance of said regulating means.

11. A regulated power supply comprising a source of voltage connected to a pair of input terminals, a pair of load terminals for connecting a load to be supplied with regulated current, an output voltage sensing amplifier and an output current sensing amplifier, a reference voltage source connected to apply a fixed reference voltage to a voltage sensing input of said voltage sensing amplifier, a series pass transistor connected in series between an input terminal of said power supply and one load terminal, the control electrode of said series pass transistor being fed by the output of said voltage sensing amplifier, a series sensing impedance connected between an input terminal and a load terminal, means for applying voltage developed across said series sensing impedance to the input of said current sensing amplifier, means for connecting the output of said current sensing amplifier to the control electrode of said series pass transistor, and a semiconductor device connected from the voltage sensing input of the voltage sensing amplifier to the control electrode of said series pass transistor in a manner so that upon conduction of said semiconductor device in response to a programming signal the input-output path of said voltage sensing amplifier becomes bypassed to provide a shorter voltage fall time to said series pass transistor than supplied by said voltage sensing amplifier.

12. In a programmed power supply wherein a source of unregulated voltage is applied to a pair of input terminals of a regulator circuit, wherein a regulated output voltage for a load is derived between a pair of output terminals of said circuit, and wherein a sample of said output voltage is amplified in an amplifier and fed back to a control electrode of a series transistor whose input electrode-output electrode path is connected between one of said input terminals and one of said output terminals to vary the impedance of said series transistor in accordance with variations in said output voltage, programmed resistance means adapted to develop a program voltage in response to an input program to said power supply, means for reverse biasing said series transistor in the event of a drop in programmed voltage across said programmed resistance means comprising a switching transistor, means including a second source of voltage independent of said source of unregulated voltage to apply a bias to a control electrode of said series transistor with a voltage that would normally drive said series transistor to cut off, means connecting the input electrode-output electrode path of said switching transistor between said programmed resistance means and the junction of the output of said amplifier and said control electrode of said series transistor, said last mentioned means comprising means to cause said switching transistor to be non-conductive during a predetermined level of normal programmed output voltages of said programmed resistance means and to conduct to apply said cutoff bias to said series transistor and to disable the output of said amplifier when said voltage developed by said programmed resistance means falls below a predetermined amplitude.

References Cited

UNITED STATES PATENTS

| 3,305,764 | 2/1967 | Todd | 323—9 |
| 3,373,342 | 3/1968 | Gately | 323—9 |
| 3,391,330 | 7/1968 | Grossoehme | 323—9 |
| 3,401,335 | 9/1968 | Perkinson | 323—9 X |

WILLIAM M. SHOOP, Jr., Primary Examiner

G. GOLDBERG, Assistant Examiner

U.S. Cl X.R.

323—22